H. A. CUMFER.
SHEET SPLITTING AND CUTTING MACHINE.
APPLICATION FILED NOV. 26, 1913.
1,107,762.
Patented Aug. 18, 1914.
3 SHEETS—SHEET 1.
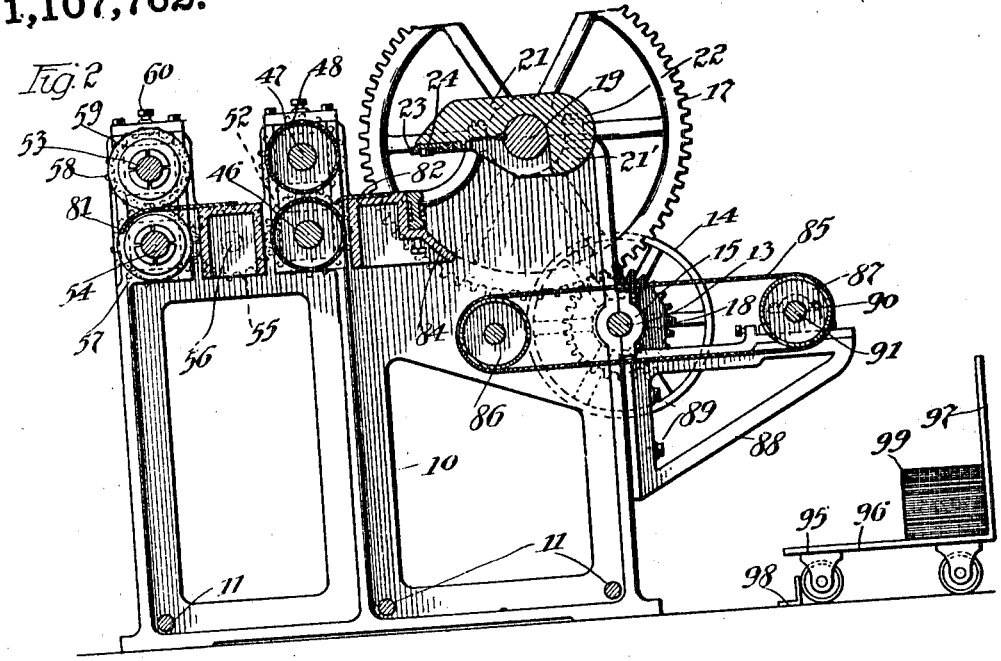
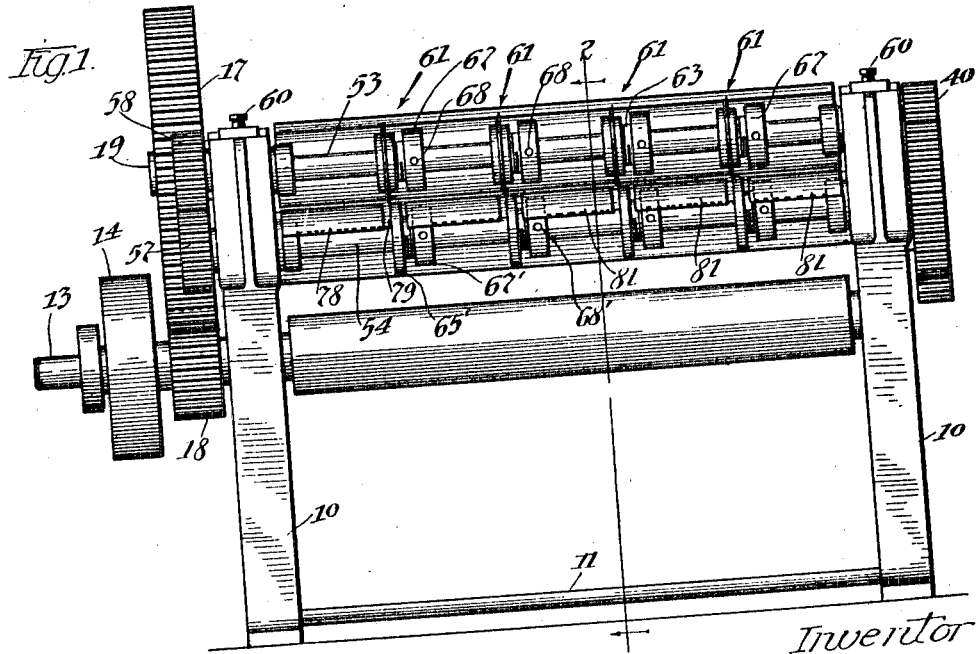
Witnesses:
Robert H. Weir
C. H. Rossner
Inventor
Harry A. Cumfer
By Horst Bainbridge
Attys.

H. A. CUMFER.
SHEET SPLITTING AND CUTTING MACHINE.
APPLICATION FILED NOV. 28, 1913.
1,107,762.
Patented Aug. 18, 1914.
3 SHEETS—SHEET 2.
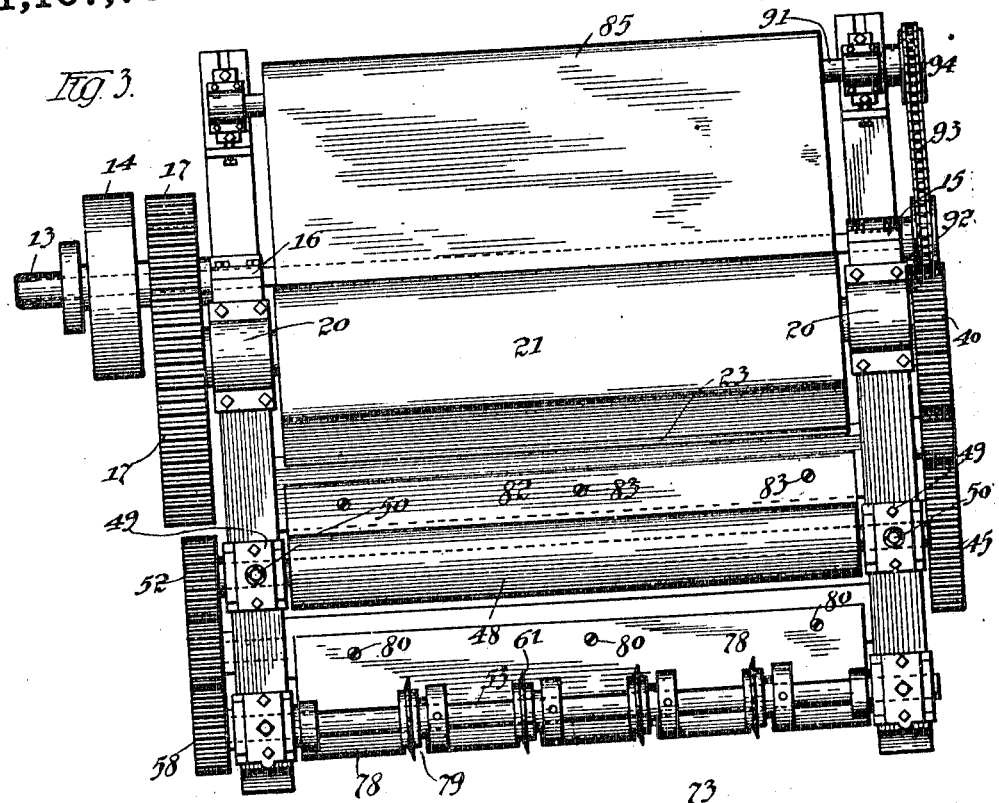
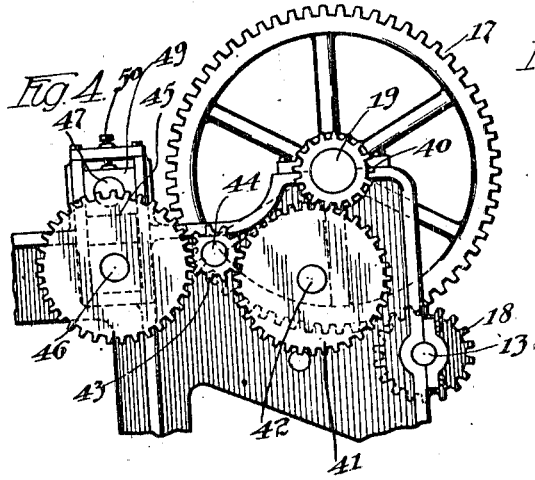
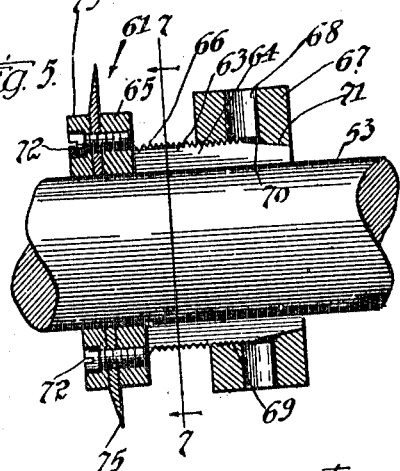
Witnesses:
Robert F. Weir
C. H. Rossner
Inventor
Harry A. Cumfer,
by Noble Bain May
Attys.

H. A. CUMFER.
SHEET SPLITTING AND CUTTING MACHINE.
APPLICATION FILED NOV. 28, 1913.
1,107,762.
Patented Aug. 18, 1914.
3 SHEETS—SHEET 3.
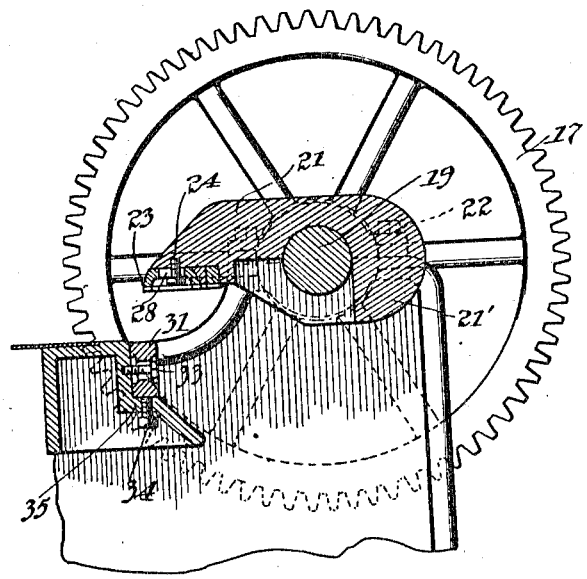
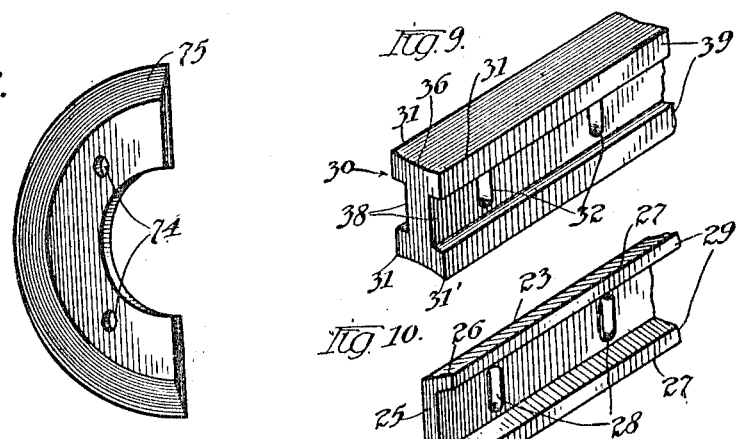
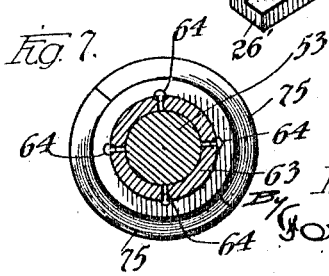

UNITED STATES PATENT OFFICE.

HARRY A. CUMFER, OF CHICAGO, ILLINOIS, ASSIGNOR TO GUYTON & CUMFER MANUFACTURING COMPANY, OF CHICAGO, ILLINOIS, A CORPORATION OF ILLINOIS.

SHEET SPLITTING AND CUTTING MACHINE.

1,107,762.

Specification of Letters Patent. Patented Aug. 18, 1914.

Application filed November 28, 1913. Serial No. 803,468.

*To all whom it may concern:*

Be it known that I, HARRY A. CUMFER, a citizen of the United States, residing at Chicago, in the county of Cook and State of Illinois, have invented certain new and useful Improvements in Sheet Splitting and Cutting Machines, of which the following is a specification.

My invention relates to improvements in sheet-splitting and cutting machines and has for its object to provide a machine for slitting and transversely cutting sheets of material, such as sheets of roofing, and the like.

One of the specific objects of my invention is to provide a self-feeding machine which will feed a slitted sheet of material from a set of slitting knives to divide the sheet into strips to a transversely cutting knife to subsequently cut the divided strips into pieces of uniform length, as in making shingles, and then pile the separate pieces or shingles in separate stacks for convenient handling.

My machine is especially adapted for cutting sheets of roofing material, such as asphaltum-treated felt into longitudinal strips and subsequently transversely cutting the strips into parts or pieces substantially the length of roofing shingles thereby to provide asphaltum shingles of equal length and dimensions after which the shingles are piled in uniform stacks.

Other, further, and more specific objects of my invention will become readily apparent, to persons skilled in the art, from a consideration of the following description when taken in conjunction with the drawings, wherein—

Figure 1 is an end elevation of the machine, showing the receiving end. Fig. 2 is a transverse section taken on line 2—2 of Fig. 1. Fig. 3 is a plan view of the machine. Fig. 4 is an enlarged fragment of an end showing the driving gearing on the said end. Fig. 5 shows a portion of the knife shaft and a longitudinal central section of the slitting knife and means for adjusting and holding the same on the shaft. Fig. 6 is an enlarged section of a portion of the device shown in Fig. 2 showing the transverse cutting knife. Fig. 7 is a transverse section taken on line 7—7 of Fig. 5 of the means for adjusting and securing the slitting knife in place on its shaft. Fig. 8 is an isometric view of one half of the circular slitting knife. Fig. 9 is a portion of one of the stationary members of the transverse cutting knife. Fig. 10 is the rotary portion or other member of the transverse cutting knife.

In all the views the same reference characters are employed to indicate similar parts.

10—10 are side frame members properly spaced apart and held by tie rods 11. A power shaft 13 is provided with a driving pulley 14 and finds bearing in the frame members 10 as at 15 and 16. This shaft carries a pinion 17 which has intermeshing driving relation with a gear wheel 18 fixed to the knife shaft 19. This transversely cutting knife shaft is provided with bearings upon the frame members 10—10 as at 20—20. The knife shaft 19 carries a knife head, 21, which extends substantially the full length of the shaft between the frames 10—10 and which is separable in two parts, 21 the major portion, and 21' secured together as by means of bolts 22. To the major portion 21, which projects further from its axis, is secured a cutting knife 23, as by bolts 24. The knife 23 is more clearly shown in Fig. 10 and consists of a body part 25 having angularly deflected side portions 26 and 26' each having a cutting edge 27. The body portion, 25 is perforated at intervals, as at 28, by means of elongated slots so as to permit adjustment of the knife blade. The knife blade, 23 may be reversed and either of its edges 27 used and it may be conveniently sharpened by grinding away the surfaces 29.

A coöperating, stationary cutting blade 30 is substantially rectangular in cross section, in general outline shaped somewhat resembling the letter I, is provided with four cutting edges 31. It is also provided with slots 32 for adjustment. It is held in place on the frame by means of bolts 33 that pass through the slots. Adjusting bolts 34 pass through a ledge 35 upon which the bottom of the knife 31 rests. The bolts 34 are located at intervals along the longitudinal portion of the ledge 35 and are means by which the blade 31 may be adjusted vertically for proper coöperation with the blade 23.

The head 21 carrying the rotating knife 23, is somewhat oblique, longitudinally, so as to give a shearing cut between the cutting edges of the knives 23 and 30 to render the cutting operation more easily performed.

By the radial adjustment of the knife 23, and the vertical adjustment of the knife 30 a wide range of positions may be effected.

To render the cutting edges 31 more acute I prefer to hollow out the top and bottom surfaces of the knife 30, as at 36, so that the blade 30 may be sharpened by simply grinding off the surfaces 39. The blade 30 is preferably rabbeted on each side, as at 38, so as to provide means whereby the heads of the bolts 33 will clear the knife 23 in its revolutions.

Any fabric or material, inserted between the knives 23 and 30 will be sheared once during each revolution of the wheel 17.

On the opposite end of the knife shaft 19 is a pinion 40, which is in geared relation with an intermediate transmitting gear wheel 41, carried on the stud 42 and this gear wheel is in geared relation with an intermediate pinion 43 that is carried upon the stud 44. The intermediate pinion 43 is used to give proper direction of rotation to the gear wheel 45 which is fixed to the shaft 46. The shafts 46 and 47 carry feed rolls 48—48. The bearings 49 for the shaft 47 are vertically adjustable by means of screws 50—50, one of the adjustable bearings and screws being arranged on each of the frames 10—10.

The feed rolls 48 feed the longitudinally severed strips to the cutting knives 23 and 30.

The shafts 46 and 47, which carry the feed rolls 48, are positively connected together as by gear wheels 52—52 so that the feed rolls 48—48 may be positively rotated.

Shafts 53 and 54 carry the slitting knives by means of which the sheet is longitudinally cut into strips. Shaft 54 is driven from the shaft 46 by means of the gear wheel 52 and the intermediate gear 55, which is carried on the stud 56, which meshes with the gear wheel 57. Shaft 53 is also provided with a similar gear wheel 58, whereby shaft 53 is positively driven by the shaft 54. These two shafts are provided with adjustable bearings 59 that may be vertically adjusted by means of screws 60—60, there being a pair of them provided on each of the frames 10—10.

At intervals along the shaft 53 are located slitting knives 61. These knives are divided each into two pieces so that they may conveniently be placed on the shaft without dismantling the same and when so placed they are adapted to be located at any convenient point along the longitudinal extent of shaft 53, as will hereinafter be more fully explained.

As shown in Fig. 5 each slitting knife structure consists of a sleeve 63 slotted at intervals, preferably at four points around its circumference, as at 64, so that the diameter thereof may be slightly contracted. The sleeve terminates at one end in a disk 65. The sleeve is screw threaded, as at 66, and a screw threaded nut 67, being radially perforated at its periphery, as at 68, for accommodation of a spanner wrench, whereby to turn the nut, is screw threaded for coaction with the sleeve, as at 69. The end of the sleeve is tapered, as at 70, and the nut is correspondingly tapered, as at 71, so that by screwing the nut 67 upon the sleeve the coacting tapered surfaces will have the effect of contracting the inner diameter of the sleeve and causing the structure to adhere closely to the knife shaft 53, so that by loosening the nut 67, the slitting blade structure may be moved to any selected point along the shaft 53 and secured thereto by tightening the nut 67. The disk portion 65 of the structure is perforated at several points for screws 72 which take through a washer 73 into the said disk 65 passing through perforations 74 made in each half of the knife 75. The screws 72 hold the washer in close contact with the knife blade 75 and in rotative engagement with the disk 65. The knives are semicircular in form and therefore may be placed upon the shaft 53 without the necessity of dismantling the shaft and threading them over the end thereof as would be necessary if they were made complete in a single piece. The coacting slitting knife member consists of the disk 65' being somewhat enlarged and made in a single piece and hardened on the surfaces confronting the knife blade 75. This part of the structure is similar to the structure just described with reference to the cutting knife 75, in every essential respect. I have therefore indicated similar parts thereof by the same reference characters with the exponent prime (') added.

The front cutting surface of the disk 65' is located on the shaft 64 secured thereto by the adjustable means heretofore described, in contact with the straight surface of the knife 75 so that when the sheet is passed between these two cutting instrumentalities it will be properly divided longitudinally into strips.

A guiding and supporting plate 78 is notched, as at 79, so not to interfere with the rotary knives and is secured to the frame, as by screws 80, and is downturned as at 81, to afford a guiding means for the sheet that is to be inserted between the rotating slitting knives and to afford a rest or support for the material as it passes through the rolls 48—48. A similar plate 82 is placed just back of the rolls 48—48 and is secured to the frame by means of screws 83. It is down-turned, as at 84, and provides a guiding and supporting means for the slitted strips just before they pass into the cutting off knife.

After the sheet has been inserted between the rotating slitting knives it passes between the rolls 48—48 and is thereby drawn through the slitting knives and properly divided into strips which are pushed forward to the transversely cutting knife which cuts the longitudinal strips into uniform, equal lengths to make asphaltum shingles, or for such other purposes for which the machine may be used.

The arrangement of the gearing is such that the rolls 48—48 will feed invariable lengths of the strips into position for cutting off, while the cutting off knife 23 is making a single revolution.

As the length of shingles is uniform and invariable it is not necessary to provide any adjustment for the purpose of severing the strips into various lengths, but if such arrangement is desirable, the gearing can be properly proportioned for that purpose.

After the rotating knife 23 has severed the strips they fall upon an inclined apron 84 and from there are precipitated upon a belt conveyer 85. This belt conveyer consists of an endless piece of canvass, or the like, passed around drums 86 and 87. A laterally projecting bracket 88 is secured to the frame as by bolts 89 to support the bearings 90 for the shaft 91 that carries the drums 87—87. The conveyer 85 is driven by means of a sprocket wheel 92 that is secured to the opposite end of the drive shaft 13 and a chain 89 that is in driving engagement with a sprocket 94 on the shaft 91. This gives proper direction of movement to the conveyer 85 to carry the shingles, or transversely cut sections, away from the cutting off knife.

In the illustrated embodiment there will be five strips cut from the sheet that passes through the machine and the knife 23 will cut the strips into five shingles which will simultaneously fall upon the conveyer 85 and be conveyed to a point of deposit. As the shingles fall from the conveyer they will fall upon a truck 95 which is provided with a base or bottom 96 and a vertical wall 97. A stop 98 regulates the distance that the truck 95 will be placed from the conveyer 85, so that the shingles will always fall upon the truck in such a position as to be quickly and easily stacked in vertical arrangement as shown at 99, so that each pile of shingles will fall upon the truck in substantially stacked relation and the number of shingles in each pile can be estimated by the height of the pile as there will always be the same number of shingles in each of the piles.

After one truck 95 has been filled it may be quickly and readily taken away and another truck placed in its position; which position is regulated and controlled by the stop 98.

While I have herein shown and described a single embodiment of my invention for the purpose of clear disclosure it is evident that changes in the structure may be made within the scope of the appended claims.

Having described my invention, what I claim is:—

1. In a machine of the character described, a rotary disk knife divided into a plurality of segments; a structure for carrying said segments, and means for securing said segments to said structure in proper alinement.

2. In a machine of the character described, a rotatable shaft; a rotary knife divided into a plurality of segments for attachment thereto; a structure for carrying said segments; means for securing said segments to said structure in proper alinement, and means for adjustably securing said structure to said shaft.

3. In a machine of the character described, a rotatable shaft, a rotatable knife divided into a plurality of segments for attachment thereto; a structure for carrying said segments consisting of a slotted sleeve having a tapered end; means for securing said segments to the other end of said sleeve, and a nut threaded on said sleeve and having a tapered coacting portion for contracting said sleeve to secure it to said shaft.

In testimony whereof I hereunto set my hand in the presence of two witnesses.

HARRY A. CUMFER.

In the presence of—
 FONEÉ BAIN,
 MARY F. ALLEN.